United States Patent [19]
Brown et al.

[11] Patent Number: 5,685,155
[45] Date of Patent: Nov. 11, 1997

[54] METHOD FOR ENERGY CONVERSION

[76] Inventors: Charles V. Brown, 1608 Cole La.;
James S. Coleman, H.C. 76 Box 41K-3, both of Big Spring, Tex. 79720

[21] Appl. No.: 381,466

[22] Filed: Jan. 31, 1995

Related U.S. Application Data

[63] Continuation of Ser. No. 164,144, Dec. 9, 1993, abandoned.

[51] Int. Cl.$^6$ .................................................. F01K 13/00
[52] U.S. Cl. ............................... 60/698; 60/652; 60/659; 60/683
[58] Field of Search .................... 60/698, 652, 659, 60/683, 398

[56] References Cited

U.S. PATENT DOCUMENTS

| | | | |
|---|---|---|---|
| 874,140 | 12/1907 | Valiquet . | |
| 2,454,058 | 11/1948 | Hays | 60/57 |
| 4,055,950 | 11/1977 | Grossman | 60/398 |
| 4,058,979 | 11/1977 | Germain | 60/327 |
| 4,358,250 | 11/1982 | Payne | 417/302 |
| 4,447,738 | 5/1984 | Allison | 290/44 |
| 4,455,834 | 6/1984 | Earle | 60/659 |
| 4,677,827 | 7/1987 | Shenoy et al. | 60/648 |
| 4,920,749 | 5/1990 | Letarte | 60/659 |
| 4,936,098 | 6/1990 | Nakhamkin | 60/659 |

*Primary Examiner*—Ira S. Lazarus
*Assistant Examiner*—L. Heyman
*Attorney, Agent, or Firm*—Charles W. Hanor; Kirt S. O'Neill

[57] ABSTRACT

A method for energy conversion and storage includes the steps of providing a supply of processed natural gas. The natural gas is compressed and stored in a sub-surface storage reservoir. The compressed natural gas is then delivered from the reservoir to an electrical power generator to thereby generate electrical energy.

14 Claims, 1 Drawing Sheet

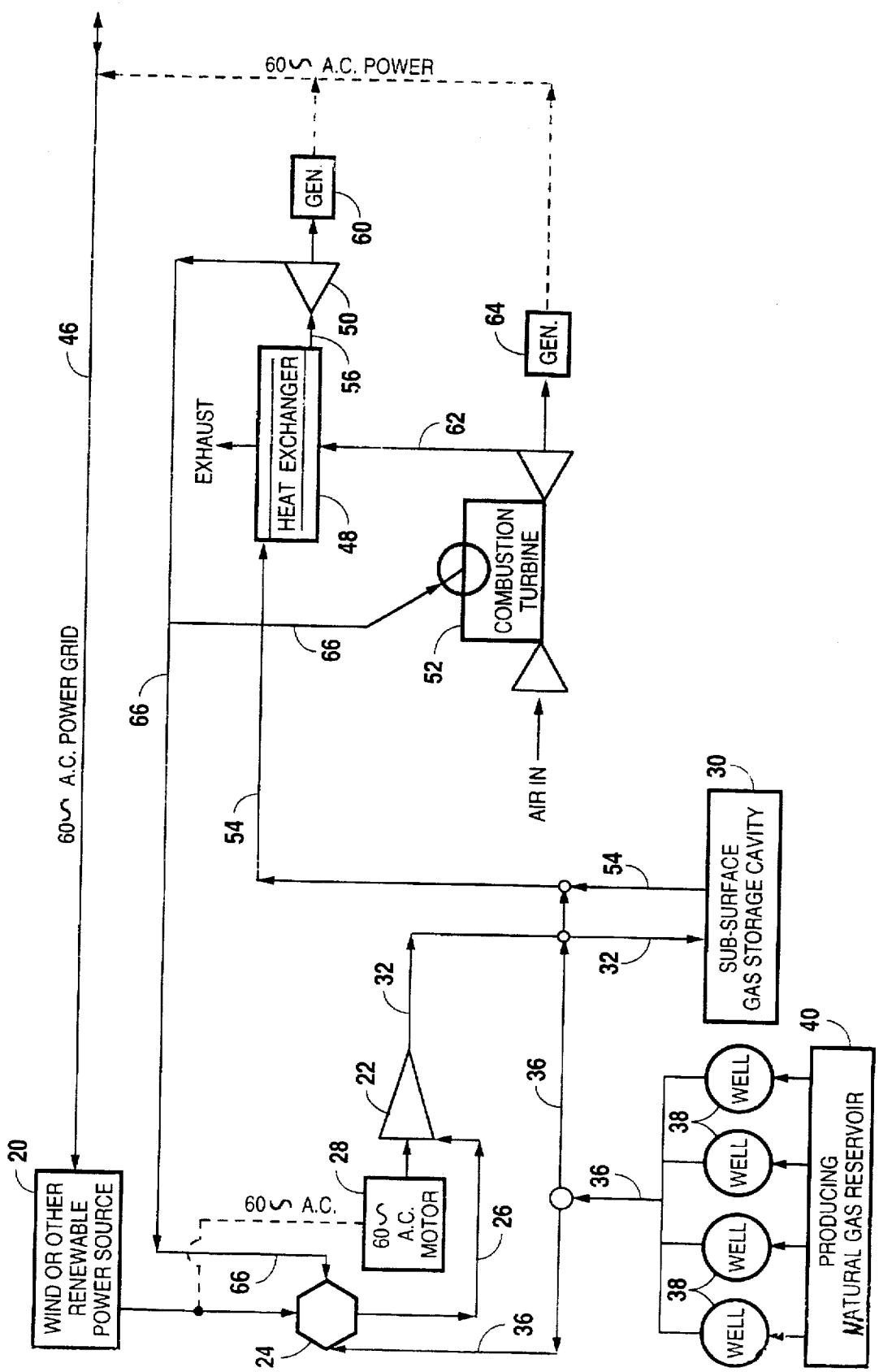

METHOD FOR ENERGY CONVERSION

This application is a continuation of application Ser. No. 08/164,144, filed Dec. 9, 1993, now abandoned.

TECHNICAL FIELD OF THE INVENTION

The present invention relates to energy conversion, and more particularly to a method for more effectively storing, scheduling and utilizing renewable and/or excess off-peak electrical power sources.

BACKGROUND OF THE INVENTION

The electrical power generating potential of renewable energy sources such as, for example, wind and solar power have been hampered by a serious drawback. When wind velocity and/or solar radiation are sufficiently strong, the generated electricity must instantaneously be delivered to the inter-connected power grid. Very rarely, do those conditions occur when the power grid is at peak-load demand. Optimum use of these important energy sources has been compromised by this drawback. Additionally, the spinning reserve of utility generating stations, and co-generation sources can be more effectively used if they could be scheduled during off-peak time frames.

A need has thus arisen for a cost-effective, safe, and reliable process to utilize the generating capacity of renewable energy sources in such a manner that this energy can be synchronized with the demand load of the power grid system to which these sources are interconnected.

SUMMARY OF THE INVENTION

In accordance with the present invention, a method for large scale energy conversion and storage is provided. The method includes the steps of providing a supply of renewable and/or excess off-peak electrical energy to compress and store a supply of processed, or produced, natural gas in a suitable sub-surface storage reservoir. When needed, the stored, compressed gas is recovered, heated in a co-generation process, and is expanded through a turbine expander driving an electrical generator, delivering power, as and when needed on the grid system.

BRIEF DESCRIPTION OF THE DRAWINGS

For a more complete understanding of the present invention and for further advantages thereof, reference is now made to the following Description of the Preferred Embodiments taken in conjunction with the accompanying Drawing which is a block diagram illustrating the present method.

DESCRIPTION OF THE PREFERRED EMBODIMENTS

Referring to the Figure, off-peak electrical power available from a renewable and/or excess off-peak electrical power source 20 is used to drive an electric motor 28 which drives a natural gas compressor 22. Power source 20 may include devices for harnessing or producing electrical power such as, for example, wind generated power, solar generated power, off-peak spinning reserve from utility system generating stations, and co-generation power providers. Source 20 may include devices for harnessing wind energy which are described in U.S. Pat. Nos. 4,358,250; 4,447,738; 4,055,950; and 4,058,979, the descriptions of which are hereby incorporated by reference.

Compressor 22 is supplied with processed natural gas from a natural gas processor/supplier plant, natural gas field, or a natural gas system 24 via a line 26. Compressor 22 is driven by electric motor 28 powered by power source 20. The processed natural gas which is compressed by compressor 22 is injected into a sub-surface gas storage reservoir, such as, for example, a salt formation storage cavity 30 via a line 32. Cavity 30 is filled to a safe working pressure, using the power generated by source 20. Cavity 30, acting as a producing volume regulator, is also interconnected via lines 36, valves, metering and pressure controls, to well heads 38 of a developed, high-pressure, producing natural gas system 40. High pressure gas from producing wells 38 supply back-up pressured natural gas to storage cavity 30 as needed.

Given a sufficient amount of time, the stored processed gas will reach equilibrium with the sub-surface ambient temperature of storage cavity 30. If storage cavity 30 is sufficiently deep, the stored gas may reach a significantly high working temperature. Such high temperatures results in a significant increase in available expansion energy when the gas stored in storage cavity 30 is recovered.

When the peak power demand occurs on the interconnected electrical power grid identified by line 46, the gas, stored within storage cavity 30, is supplied to surface power generating facilities including an exhaust gas heat exchanger 48 via line 54 at the compressed gas existing pressure and temperature.

The compressed gas supplied from storage cavity 30 is heated additionally, as needed, in exhaust gas heat recovery exchanger 48. The heated, high pressure gas stream is expanded through the use of a turbine expander generator 50 which may comprise, for example, an axial flow turbine expander which drives an AC electrical generator 60 through a suitable drive train. Generator 60 is phased with the inter-connected power grid 46 to deliver power during optimum peak load periods. The high pressure gas stream is supplied to turbine-expander generator 50 via line 56.

During peak load generation/stored gas withdrawal periods, the producing natural gas wells 38 connected to storage cavity 30 act as a pressure back-up system to storage cavity 30. As the pressure in storage cavity 30 is lowered by withdrawal of compressed gas, the producing gas wells 38 begins to deliver high pressure gas via line 36 to storage cavity 30 when the throttle pressure at turbine expander 50 reaches a minimum preset value, based upon load requirements.

Additional peak power is produced by using a portion of the expanded, low pressure gas via a gas line 66 or other approved alternative fuel, to fire a combined cycle, combustion turbine generator 52 or other internal combustion machine. The high temperature exhaust via line 62 from combustion turbine 52 is utilized in heat exchanger 48 to add additional heat to the incoming, high pressure, stored gas stream via line 54 prior to gas expansion through the turbine expander 50 via line 56. A very small portion of the LP fuel gas stream via line 66 used to fire combustion turbine 52 will produce a net electrical power output that will equate to 100% of the off-peak power utilized to store the gas originally. Both the stored energy recovery efficiency, and the combined cycle co-generation thermal efficiency are very high. The expanded, low pressure gas, discharged from the turbine expander 50 is returned, via line 66, to process 24 for delivery into the storage system.

It therefore can be seen that the present process is very efficient in the generation of electrical power, and more adaptable to large scale power generation and storage rather than using compressed air or other working fluids. The present method achieves this efficiency by use of the sub-surface gas reservoir's inherent pressure and temperature, as well as the utilization of large and deep storage volumes as storage cavities.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A method for energy conversion and storage comprising the steps of:

providing a supply of natural gas;

providing a supply of electrical energy to produce compressed natural gas from the supply of natural gas;

delivering the compressed natural gas to a means for storing gas; and delivering the compressed natural gas from the means for storing gas to a turbine expander driving an electrical generator to thereby generate electrical energy.

2. The method of claim 1 wherein the step of delivering compressed natural gas further includes delivering natural gas from a natural gas well.

3. The method of claim 1 wherein the step of providing a supply of electrical energy includes providing the supply from a renewable power source.

4. The method of claim 3 wherein the renewable power source includes ambient wind.

5. The method of claim 1 further comprising the step of heating the compressed natural gas.

6. The method of claim 5 wherein the step of heating is performed with exhaust heat from a co-generation process.

7. The method of claim 6 wherein the co-generation process is supplied at least in part by natural gas from the turbine expander.

8. A method for energy conversion and storage comprising the steps of:

providing a supply of natural gas;

providing electrical power from a renewable power source;

using the power from the renewable power source to produce compressed natural gas from the supply of natural gas;

delivering the compressed natural gas to a means for storing gas;

recovering the stored compressed natural gas;

heating the recovered compressed natural gas; and expanding the heated recovered compressed natural gas to drive a first electrical generator to produce electrical energy.

9. The method of claim 8 wherein the step of providing electrical power from the renewable power source includes the step of utilizing the force of ambient wind.

10. The method of claim 8 wherein the step of heating includes delivering the recovered stored compressed natural gas to a co-generation exhaust heat exchange process.

11. The method of claim 8 wherein the step of expanding includes delivering the heated recovered compressed natural gas to a turbine expander.

12. The method of claim 8 wherein the step of heating is performed with exhaust heat from a combustion turbine.

13. The method of claim 12 wherein the combustion turbine is supplied at least in part by natural gas from the expanding step.

14. The method of claim 8 wherein the combustion turbine drives a second electrical generator, thereby generating additional electrical energy.

* * * * *